(12) United States Patent
Gombos

(10) Patent No.: US 11,535,387 B1
(45) Date of Patent: Dec. 27, 2022

(54) ENHANCED AUTOMATIC ACTIVATION DEVICE

(71) Applicant: MORSECORP, Inc., Cambridge, MA (US)

(72) Inventor: Daniel Gombos, Somerville, MA (US)

(73) Assignee: MORSECORP, Inc., Cambridge, MA (US)

(*) Notice: Subject to any disclaimer, the term of this patent is extended or adjusted under 35 U.S.C. 154(b) by 1182 days.

(21) Appl. No.: 16/053,119

(22) Filed: Aug. 2, 2018

(51) Int. Cl.
| | |
|---|---|
| *B64D 17/56* | (2006.01) |
| *B64D 17/74* | (2006.01) |
| *G06N 3/02* | (2006.01) |
| *B64D 21/00* | (2006.01) |
| *G06N 20/10* | (2019.01) |

(52) U.S. Cl.
CPC .............. *B64D 17/56* (2013.01); *B64D 17/74* (2013.01); *B64D 21/00* (2013.01); *G06N 3/02* (2013.01); *G06N 20/10* (2019.01)

(58) Field of Classification Search
CPC ...................................................... B64D 17/56
See application file for complete search history.

(56) References Cited

U.S. PATENT DOCUMENTS

| | | | |
|---|---|---|---|
| 3,547,383 A | 12/1970 | Carpenter | |
| 5,169,093 A | 12/1992 | Rainer | |
| 5,583,771 A * | 12/1996 | Lynch | B60R 21/01338 180/282 |
| 6,880,786 B2 | 4/2005 | Weis et al. | |
| 7,040,580 B1 * | 5/2006 | Cloth | B64D 17/56 244/152 |
| 7,073,752 B2 | 7/2006 | Voronka et al. | |
| 7,975,967 B2 | 7/2011 | Smolders | |
| 9,604,726 B2 | 3/2017 | Fourie | |
| 9,689,887 B1 * | 6/2017 | Srinivas | G01C 15/00 |

(Continued)

FOREIGN PATENT DOCUMENTS

| | | |
|---|---|---|
| WO | 2013191727 A1 | 12/2013 |
| WO | 2017097292 A1 | 6/2017 |

OTHER PUBLICATIONS

London, "Using Daylight to Make Drones Disappear," Slice of MIT, Nov. 6, 2017 [retrieved on Jun. 1, 2022], retrieved from URL <https://alum.mit.edu/slice/using-daylight-make-drones-disappear>, 7 pages.

*Primary Examiner* — Olisa Anwah
(74) *Attorney, Agent, or Firm* — Fish & Richardson P.C.

(57) ABSTRACT

An enhanced automatic activation device (EAAD) is provided. The EAAD includes a housing; a plurality of environmental sensors disposed within the housing; a connection to a reserve canopy deployment mechanism, the connection being disposed at least partially within the housing; and a processor coupled to the plurality of environmental sensors and the connection. The processor is configured to execute a machine learning process. The machine learning process is configured to classify environmental data from the plurality of environmental sensors into either a first group associated with nominal deployment of a main canopy of a parachute rig or a second group associated with failed deployment of the main canopy of the parachute rig. The processor is also configured to transmit a signal to the reserve canopy deployment mechanism where the machine learning process classifies the environmental data within the second group.

33 Claims, 8 Drawing Sheets

(56) References Cited

U.S. PATENT DOCUMENTS

| | | |
|---|---|---|
| 2005/0127242 A1 | 6/2005 | Rivers |
| 2005/0127243 A1* | 6/2005 | Voronka ................. B64D 17/56 |
| | | 244/150 |
| 2011/0121138 A1 | 3/2011 | Walsh et al. |
| 2017/0081011 A1 | 3/2017 | Matthews et al. |

* cited by examiner

ENHANCED AUTOMATIC ACTIVATION DEVICE

STATEMENT REGARDING FEDERALLY SPONSORED RESEARCH OR DEVELOPMENT

This invention was made with government support under contract number W911QY-17-C-0014 awarded by the United States Department of the Army. The government has certain rights in the invention.

BACKGROUND

The present disclosure is related to automatic activation devices (AADs). AADs are a safety mechanism built into many modern parachute rigs. AADs are designed to deploy a reserve canopy automatically where such deployment is needed for the safety of an operator. For example, some conventional AADs use a barometer to monitor altitude and descent speed. These AADs automatically deploy the reserve canopy where the AAD reaches a minimum altitude and the descent speed exceeds an expected descent speed (e.g., a descent speed with the main canopy completely and properly deployed). Conventional AADs require calibration to the "pressure of the day" at ground level so that the barometer can reliably determine whether the minimum altitude has been reached. In addition, conventional AADs may further require calibration on the ground to set the pressure altitude of a landing location prior to use.

SUMMARY

In accordance with some examples of the present disclosure, an enhanced automatic activation device (EAAD) is provided. The EAAD may be configured for use in conjunction with a variety of aerial deceleration devices that include a primary decelerator and at least one secondary decelerator. For instance, in some examples, the EAAD is included with a fixed wing aircraft. In these examples, the fixed wing aircraft includes wings, flaps, and/or other aerodynamic elements that function as a primary decelerator and a spin recovery parachute that functions as a secondary decelerator. Further, in this example, the EAAD is configured to initiate deployment of the spin recovery parachute where environmental parameters indicate that the aircraft is spinning out of control (e.g., a flat spin or the like).

In other examples, the EAAD is included with a spacecraft that includes a reentry system with one or more canopy deployment systems that function as both a primary decelerator and one or more secondary decelerators. In these examples, the EAAD is configured to initiate deployment of one or more canopies included in the reentry system where environmental parameters indicate a reentry stage associated with each canopy. In other examples, the EAAD is included with an Earth entry vehicle that includes aerodynamic decelerators that function as both a primary decelerator and one or more secondary decelerators. In these examples, the EAAD is configured to manipulate the aerodynamic decelerators through a sequence of physical configurations where environmental parameters indicate atmospheric conditions associated with each physical configuration. In other examples, the EAAD is included with a land vehicle (e.g., an automobile, rocket sled, motorcycle, etc.) that includes friction decelerators (e.g., brakes) that function as a primary decelerator and a reserve canopy that functions as a secondary decelerator. In these examples, the EAAD is configured to initiate deployment of the reserve canopy where environmental parameters indicate an unsafe velocity, trajectory, or position. In other examples, the EAAD is included with a wing suit, or a similar application, with a parachute rig that functions as both a primary decelerator and a secondary decelerator. In these examples, the EAAD is configured to initiate deployment of a main and/or reserve canopy within the parachute rig where environmental parameters indicate an unsafe trajectory. For instance, in at least one of these examples, the EAAD detects a failed main canopy and, in response, initiates deployment of the reserve canopy. These applications, and others, will be apparent in light of the following disclosure.

In some examples, the EAAD is included with a parachute rig that includes a main canopy, which functions as a primary decelerator, and a reserve canopy, which functions as a secondary decelerator. In this example, the EAAD is configured to initiate deployment of the reserve canopy where environmental parameters indicate failure of the main canopy (e.g., failure to deploy properly, failure of the structural integrity, etc.). Further, in this example, the EAAD is configured for low-altitude operations, such as may be conducted by paratroopers or base jumpers. In some cases, these low-altitude operations may involve the use of a static line to initiate deployment of the main decelerator. In these examples, the EAAD is configured to monitor and quickly determine whether the main decelerator is acting nominally. Where the main decelerator is not acting nominally, the EAAD is configured to initiate deployment of a reserve decelerator.

As the EAAD is designed for low-altitude operations, its operational environment is more stringent than the operational environment for a conventional AAD used by free-fall jumpers. For instance, in some examples, the EAAD must execute in less than 5 seconds to determine whether deployment of the reserve decelerator is warranted, as compared to conventional AADs, which typically must execute in 10-15 seconds. To operate successfully in this environment, some examples of the EAAD execute a trained machine learning process that analyzes diverse sensor input data. This machine learning process quickly and robustly identifies a nominal main decelerator state vs a failed, or partially failed, state (e.g., one where the reserve decelerator needs to be deployed). In some examples, the diverse sensor input data monitored by the EAAD includes a variety of environmental parameters. These environmental parameters may include air pressure, acceleration, rotation rate, humidity, geographic location, imagery, ambient light, and ambient sound, among other parameters.

In at least one example, the trained machine learning process executed by the EAAD includes a support vector machine (SVM) that classifies portions of environmental data into either a first or second group. The first group comprises instances of environmental data associated with a nominal deployment of the main decelerator. The second group comprises instances of environmental data associated with a failed deployment of the main decelerator. Where the machine learning process classifies a sufficient amount of the environmental data within the second group with a sufficient level of confidence, the EAAD sends a signal to a deployment mechanism within the aerial deceleration device to initiate deployment of the reserve decelerator. In some examples, the signal may carry power sufficient to activate the deployment mechanism. What constitutes a sufficient amount of environmental data and a sufficient level of confidence may vary between examples and is described further below.

In some examples, the EAAD stores the environmental data that it processes within data storage. This functionality can be used by the EAAD to generate a set of training data. For instance, in some examples, the EAAD is affixed to a training payload outfitted with an aerial deceleration device including the EAAD. This training payload may have physical characteristics (surface area, density, weight, humanoid shape, and the like) similar to a human operator. In at least one example, the training payload is a mannequin. In some examples, to generate an instance of training data, the training payload is released from an aircraft with the aerial deceleration device attached to a static line, thereby initiating deployment of the main decelerator once the training payload has reached an appropriate distance from the aircraft. To generate the set of training data, multiple releases of the training payload are conducted. In some releases, the main decelerator is configured to deploy properly. In other releases, the main decelerator is configured to fail in one or more particular ways. For example, where the main decelerator is a main canopy, the deployment of the main canopy may be configured to result in a streamer failure, a partial failure, a no-main failure, or the like. Training data may be collected evenly for the types of decelerator deployment configurations with an equal distribution of light (e.g., less than or equal to 250 pounds) and heavy weight payloads (e.g., greater than 250 pounds). This training data may be used to train the one or more machine learning processes described herein.

In at least one embodiment, an enhanced automatic activation device (EAAD) is provided. The EAAD includes a housing, a plurality of environmental sensors disposed within the housing, a connection to a deployment mechanism of a secondary decelerator, the connection being disposed at least partially within the housing, and at least one processor coupled to the plurality of environmental sensors and the connection. The at least one processor is configured to execute at least one machine learning process configured to classify environmental data from the plurality of environmental sensors into either a first group associated with nominal deployment of a primary decelerator or a second group associated with at least partially failed deployment of the primary decelerator; and transmit a signal to the deployment mechanism of the secondary decelerator where at least one criterion is met, the at least one criterion requiring that the environmental data be classified within the second group.

In the EAAD, the primary decelerator may include a main canopy of a parachute rig and the secondary decelerator may include a reserve canopy of the parachute rig. The plurality of environmental sensors may include two or more of a barometer, an altimeter, a hygrometer, a thermometer, a magnetometer, a microphone, a photodetector, a global positioning system (GPS) receiver, a camera, an accelerometer, and a gyroscope. The deployment mechanism of the secondary decelerator may include either a cutter or a release. The at least one machine learning process may include one or more of a support vector machine and an artificial neural network.

In the EAAD, the plurality of environmental sensors may be configured to acquire a plurality of signals to generate the environmental data, and the at least one processor may be configured to determine whether the at least one criterion is met in less than 5 seconds from acquisition of the signals. The at least one machine learning process may be configured to classify the environmental data independently of air pressure at ground level and pressure altitude at ground level, thereby eliminating any need to calibrate the EAAD to ground level. The plurality of environmental sensors may be configured to originate a plurality of environmental data streams and the at least one processor may be further configured to segment each environmental data stream of the plurality of environmental data streams into a plurality of time windows, each time window of the plurality of time windows including a set of environmental data.

In the EAAD, the at least one processor may be further configured to smooth each set of environmental data to generate a plurality of smoothed sets of environmental data. The at least one processor may be configured to smooth at least one set of environmental data at least in part by averaging two or more elements of the at least one set. The at least one processor may be configured to smooth at least one set of environmental data at least in part by filtering the at least one set using one or more of a high-pass filter, a low-pass filter, a band-pass filter, and a butterworth filter. The at least one processor may be further configured to calculate a feature from each set of environmental data to generate a plurality of feature vectors. Each feature vector of the plurality of feature vectors may include elements descriptive of vertical velocity, total acceleration, and total rotation. The at least one machine learning process may be configured to classify the environmental data at least in part by classifying the plurality of feature vectors.

In the EAAD, the at least one machine learning process may be configured to generate one or more metrics indicative of confidence that the environmental data is a member of the second group and the at least one criterion may further require that a summary based on the one or more metrics have a value that transgress a threshold value. The summary may be an average of the one or more metrics. The at least one machine learning process may be further configured to classify the environmental data from the plurality of environmental sensors into either a third group associated with an in-aircraft environment or a fourth group associated with an out-of-aircraft environment. The at least one machine learning process may be configured to generate one or more metrics indicative of confidence that the environmental data is a member of the fourth group and the at least one criterion may further require that a summary based on the one or more metrics have a value that transgresses a threshold value.

According to another embodiment, a method of deploying a decelerator using an enhanced automatic activation device (EAAD) is provided. The method includes acts of executing, by the EAAD, at least one machine learning process; classifying, by the at least one machine learning process, environmental data from a plurality of environmental sensors into either a first group associated with nominal deployment of a primary decelerator or a second group associated with at least partially failed deployment of the primary decelerator; and transmitting, by the EAAD, a signal to a deployment mechanism of a secondary decelerator where at least one criterion is met, the at least one criterion requiring that the environmental data be classified within the second group.

The method may further include an act of acquiring, by the plurality of environmental sensors, a plurality of signals to generate the environmental data; and may include an act of determining whether the at least one criterion is met in less than 5 seconds from acquisition of the signals. The method may further include an act of classifying the environmental data independently of air pressure at ground level and pressure altitude at ground level, thereby eliminating any need to calibrate the EAAD to ground level. The method may further include an act of originating, by the plurality of environmental sensors, a plurality of environmental data streams; and segmenting each environmental data stream of the plurality of environmental data streams into a plurality of time windows, each time window of the plurality of time windows including a set of environmental data.

The method may further include an act of smoothing each set of environmental data to generate a plurality of smoothed sets of environmental data. The method may further include an act of smoothing at least one set of environmental data at least in part by averaging two or more elements of the at least one set. The method may further include an act of smoothing at least one set of environmental data at least in part by filtering the at least one set using one or more of a high-pass filter, a low-pass filter, a band-pass filter, and a butterworth filter. The method may further include an act of calculating a feature from each set of environmental data to generate a plurality of feature vectors.

The method may further include an act of generating, by the at least one machine learning process, one or more metrics indicative of confidence that the environmental data is a member of the second group, wherein transmitting the signal includes transmitting a signal where the at least one criterion requires that a summary based on the one or more metrics have a value that transgresses a threshold value. The method may further include an act of classifying, by the at least one machine learning process, the environmental data from the plurality of environmental sensors into either a third group associated with an in-aircraft environment or a fourth group associated with an out-of-aircraft environment. The method may further include an act of generating, by the at least one machine learning process, one or more metrics indicative of confidence that the environmental data is a member of the fourth group; and wherein transmitting a signal further may include the at least one criterion further requiring that a summary based on the one or more metrics have a value that transgresses a threshold value.

In another embodiment, a non-transitory computer readable medium storing sequences of instruction for deploying a decelerator is provided. The computer readable medium includes instructions configured to instruct at least one processor to execute at least one machine learning process configured to classify environmental data from a plurality of environmental sensors into either a first group associated with nominal deployment of a primary decelerator or a second group associated with at least partially failed deployment of the primary decelerator; and transmit a signal to a deployment mechanism of a secondary decelerator where at least one criterion is met, the at least one criterion requiring that the environmental data be classified within the second group.

In the computer readable medium, the instructions to execute the at least one machine learning process may include instructions to execute one or more of a support vector machine and an artificial neural network. The sequences of instructions may include instructions configured to determine whether the at least one criterion is met in less than 5 seconds from acquisition of signals acquired to generate the environmental data. The instructions to execute the at least one machine learning process may include instructions to classify the environmental data independently of air pressure at ground level and pressure altitude at ground level. The instructions to execute the at least one machine learning process may include instructions to classify the environmental data at least in part by classifying a plurality of feature vectors, each feature vector of the plurality of feature vectors including elements descriptive of vertical velocity, total acceleration, and total rotation.

Still other aspects, examples and advantages of these aspects and examples, are discussed in detail below. Moreover, it is to be understood that both the foregoing information and the following detailed description are merely illustrative examples of various aspects and features, and are intended to provide an overview or framework for understanding the nature and character of the claimed aspects and examples. Any example or feature disclosed herein may be combined with any other example or feature. References to different examples are not necessarily mutually exclusive and are intended to indicate that a particular feature, structure, or characteristic described in connection with the example may be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects, and are incorporated in and constitute a part of this specification, but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
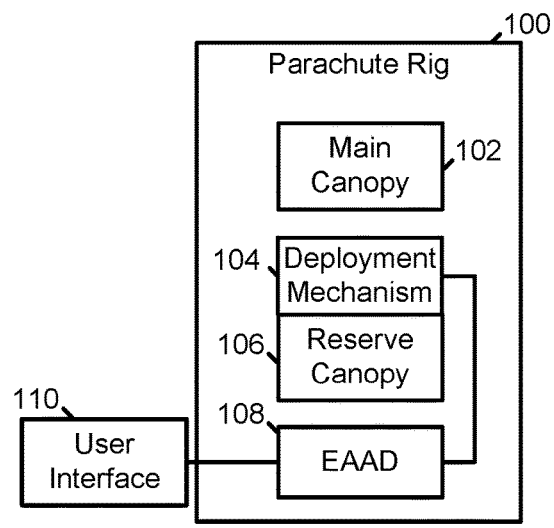
FIG. 1 is a block diagram illustrating a parachute rig including an EAAD in accordance with an example of the present disclosure.

As summarized above, various examples described herein are directed to an EAAD that is configured to monitor a variety of environmental parameters to detect whether deployment of a reserve canopy is warranted for the safety of an operator. In some examples, the EAAD includes one or more environmental sensors configured to acquire signals descriptive of the environmental parameters. Examples of these environmental sensors include barometers, altimeters, hygrometers, thermometers, magnetometers, microphones, photodetectors, global positioning system (GPS) receivers, cameras, and inertial measurement units (IMUs). Examples of IMUs include accelerometers, gyroscopes, and magnetometers. These environmental sensors are communicatively coupled to one or more processors. The processors digitize and condition the acquired signals to generate environmental data that represents measurements of the environmental parameters.

In some examples, at least one of the processors of the EAAD is configured to segment the environmental data into discrete sets based on values of one or more dimensions of the environmental data. For instance, in at least one example, the processor is configured to segment the environment data into discrete time windows spanning a predefined duration. This predefined duration may vary between examples, but in at least one example the predefined duration ranges between 1 Hz and 100 Hz. These sets of environmental data may be subject to a variety of additional processing.

For instance, in some examples, at least one of the processors of the EAAD is configured to calculate one or more features from each set of environmental data. Examples of these features may include acceleration magnitude, rotation rate magnitude, vertical velocity, ambient light, ambient sound, imagery-based parachute state, and the like. In certain examples, at least one of the processors of the EAAD is configured to execute one or more machine learning processes to classify each set of environmental data into one of a plurality of groups. In at least one example, a first machine learning process is a trained SVM that classifies each set of environmental data as being a member of an in-aircraft group or an out-of-aircraft group. Further, in this example, a second machine learning process is a trained SVM that classifies each set of environmental data as being a member of a failed-main group or a nominal-main group. In some examples, the machine learning process is configured to generate metrics indicative of levels of classification confidence. Each of these classification confidence metrics corresponds to a distinct combination of environmental data set and group and each classification confidence metric indicates a level of confidence that the environmental data set is a member of the group.

In some examples, at least one processor of the EAAD is configured to monitor classification confidences of each environmental data set generated by the EAAD to determine whether deployment of the reserve canopy is warranted. In some examples, the at least one processor of the EAAD is configured to monitor classification confidences only after a sufficient delay (e.g., 1-3 seconds) subsequent to aircraft exit. For instance, in some examples, the processor is configured to determine that deployment of the reserve canopy is warranted where a sufficient amount of environmental data is classified within the failed-main group with a sufficient classification confidence. In some examples, to be a sufficient amount of environmental data, the amount of environmental data must span a time period of one second. In other examples, to be a sufficient level of confidence, the level of confidence must exceed a threshold value as described further below. The amount of environmental data and the level of confidence configured as being sufficient may be stored as a configurable value within a memory of the EAAD. In these examples, the processor is configured to transmit a signal to a deployment mechanism to deploy the reserve canopy in response to the processor determining that deployment of the reserve canopy is warranted.

In some examples, the processor is configured to calculate a statistical summary (e.g., an average) of the level of confidence over a time window when determining whether the level of confidence has exceeded the threshold value. In these examples, the processor is configured to transmit the signal to the deployment mechanism to deploy the reserve canopy where the statistical summary exceeds the threshold value.

In some examples, at least one processor of the EAAD is configured to store the environmental data that it processes within local data storage. In these examples, the processor is configured to implement a logger that executes a logging process using the data received from other components of the EAAD. The logging process stores the data on the data storage and is described further below. In some examples, the EAAD described herein is configured to generate a set of training data via the logger.

In some examples, a computing device is configured to execute a training process to train the one or more machine learning processes using the set of training data. For instance, in certain examples, this training process is supervised with each instance of training data being labeled to indicate its group. In at least one example, the machine learning process is an SVM and the training process generates parameters for the SVM, such as the support vectors, alpha value, bias value, and the like.

Examples of the EAAD described herein represent a number of improvements upon conventional AADs. For instance, some examples of the EAAD are configured to minimize required interaction between the EAAD and the operator. In these examples, the EAAD is configured to detect in/out of aircraft state and automatically begin monitoring an operator's descent upon aircraft exit. Further, some examples of the EAAD analyze pressure change over time from the barometer independently of pressure altitude, thereby eliminating the need to calibrate to ground-level pressure altitude. In other examples, the EAAD is configured to send a signal to deploy the reserve parachute immediately upon detecting a failed chute, eliminating the requirement for a user to set a minimum deployment altitude, as used by conventional AADs.

Some examples of the EAAD include additional sensors (e.g., microphones and photodetectors, among others) that conventional AADs lack. These examples incorporate environmental data generated via these additional sensors into their processing. Some examples of the EAAD log environmental parameters until ground level is reached. This is unlike conventional AADs, which stop monitoring once the main canopy is deployed. Moreover, some examples of the EAAD do not refer to a target descent speed below a predefined altitude and do not use timers like conventional AADs.

Due to the improvements listed above, among others, some examples of the EAAD are suitable for paratroopers, which conventional AADs are ill-suited to support. Because of their low altitude jumps, paratroopers have limited time (e.g., 3-5 seconds) to decide if they should deploy their reserve canopy. Examples of the EAAD disclosed herein can meet this stringent time requirement in contrast to conventional AADs, which have significantly more time to respond (e.g., 10 seconds or more). Sometimes, paratroopers are incapacitated and cannot make a decision regarding reserve canopy deployment. Further, partially failed main canopies are difficult to detect, yet still result in dangerous descent speeds at landing. This problem is exacerbated by the paratrooper's high-intensity combat environment and frequent nighttime operations. Deploying the reserve canopy while inside the aircraft is potentially fatal. Failing to deploy the reserve when necessary is also potentially fatal. Deploying the reserve when not necessary increases the time aloft, increasing the risk of adversary aggression. Thus paratroopers are under high cognitive load and can often miss or improperly execute interactions required for conventional AADs, such as turning on the AAD just before jumping, programming ground-level pressure altitude, setting minimum deployment altitude, and the like.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular may also embrace examples including a plurality, and any references in plural to any example, component, element or act herein may also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

EAAD System Architecture

In some examples, an EAAD is configured to protect its operator by monitoring the operator's descent and detecting whether a reserve canopy within a parachute rig worn by the operator should be deployed for the safety of the operator. FIG. 1 illustrates one example of a parachute rig 100 including an EAAD 108 in accordance with some examples. As shown, the parachute rig 100 includes a main canopy 102, a deployment mechanism 104, at least one reserve canopy 106, the EAAD 108 and a user interface 110 of the EAAD 108.

As illustrated in FIG. 1, the main canopy 102 and the reserve canopy 106 may include various types of parachute canopies, such as round, cruciform, and ram-air canopies. The deployment mechanism 104 may include any of a variety of automated canopy deployment mechanisms, such as an automatic cutter or release that may be a mechanical, an electrical, a pyrotechnic, or other mechanism. The user interface 110 may include a variety of human-machine interface elements, such as light-emitting diodes, liquid crystal displays, toggle switches, slide switches, display screens, touch screens, buttons, and the like. The EAAD 108 may include any of a variety of environmental sensors and other components as described further below.

Figure 2:
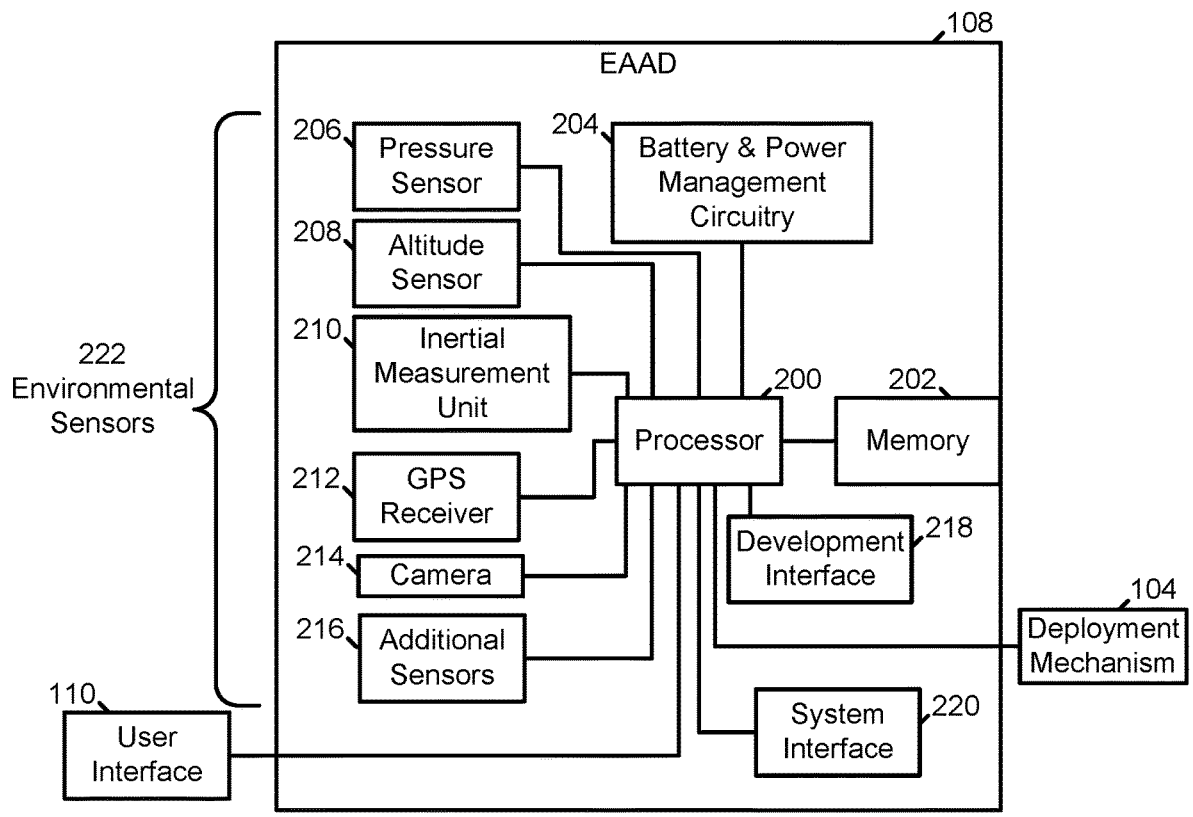
FIG. 2 is a block diagram depicting physical components of the EAAD illustrated in FIG. 1 in accordance with an example of the present disclosure.

FIG. 2 illustrates the physical architecture of one example of the EAAD 108 in accordance with some examples. In these examples, the EAAD 108 includes components and an enclosure or housing that are designed to withstand a temperature range of −40 degrees to 100 degrees Celsius and impact velocities of up to 50 feet per second. As shown in FIG. 2, this physical architecture includes a processor 200, a memory 202, battery and power management circuitry 204, a collection of environmental sensors 222, a development interface 218 (e.g., Joint Test Action Group interface, etc.), and a system interface 220 (e.g., universal serial bus interface, etc.). The collection of environmental sensors 222 includes a pressure sensor 206, an altitude sensor 208, an IMU 210, a GPS receiver 212, a camera 214, and potential additional sensors 216. The IMU 210 may include one or more accelerometers, one or more gyroscopes, and/or one or more magnetometers. As shown in FIG. 2, the processor 200 of the EAAD 108 is coupled to the user interface 110 and the deployment mechanism 104.

The processor 200 may include one or more of a variety of processors or controllers such as a multi-core processor, single-core processor, or microcontroller. As shown, the processor 200 is coupled to the remaining components of FIG. 2. The processor 200 is configured to perform a series of instructions that result in manipulated data. The processor 200, by being coupled to the memory 202 and the software stored therein, is configured to implement a variety of processes described herein. In at least one example, the processor 200 includes a ATSAM4E16E microcontroller available from Microchip Technology Inc. The memory 202 may include any of a variety of volatile and/or non-volatile computer readable and/or writable memory, such as complementary metal-oxide-semiconductor memory, random access memory, read-only memory, flash memory, a secure digital (SD) card, and the like. The memory 202 may be coupled to the processor 200 via a variety of interconnection mechanisms, such as a high-speed system bus and/or a serial peripheral interface, depending on the particular type of the memory 202. In some examples, the memory 202 is configured to store software defining one or more of the components illustrated in FIG. 3 below and/or store environmental data generated by the EAAD 108.

As shown in FIG. 2, the battery and power management circuitry 204, the pressure sensor 206, the altitude sensor 208, the IMU 210, and the GPS receiver 212 may include any of a variety of commercially available components. For instance, in one example, the battery has a capacity of 16.8 Wh and a voltage of 3.6V. In this example, the power management and distribution circuitry is configured to manage the battery, regulate voltage during discharge, and manage charging, where the battery is of a rechargeable variety. In some examples, the battery and power management circuitry 204 is coupled to the processor 200 via a Japan Solderless Terminal connector. In some examples, the pressure sensor 206 and the altitude sensor 208 are integrated into a unitary sensor, such as the BME280 Barometric Pressure Sensor available from Robert Bosch GmbH. The IMU 210 may include one or more of an accelerometer, a gyroscope, and a magnetometer. For instance, in at least one example, the IMU 210 includes a MPU9250 combination gyroscope, accelerometer, magnetometer available from Shenzhen HiLetgo E-commerce, Co., Ltd. In some examples, the pressure sensor 206, the altitude sensor 208, and the IMU 210 are coupled to the processor 200 via an inter-integrated circuit. In another example, the GPS receiver 212 is a NEO-M8N series GPS receiver available from u-blox Holding AG. In some examples, the GPS receiver 212 is coupled to the processor 200 via a universal asynchronous receiver-transmitter. The additional sensors 216 illustrated in FIG. 2 may include hygrometers, thermometers, microphones, cameras, and photodetectors among other types of environmental sensors. The development interface 218 may include a Joint Test Action Group interface to enable development and/or testing of the EAAD 108. The system interface 220 may include one or more of a variety system interfaces, such as a universal serial bus interface.

In some examples in accordance with FIG. 2, the EAAD 108 includes a housing 112 fabricated from production grade materials that surrounds and protects the processor 200, the memory 202, the battery and power management circuitry 204, the pressure sensor 206, the altitude sensor 208, the IMU 210, the GPS receiver 212, the additional sensors 216, the development interface 218, and the system interface 220. These production grade materials may include aluminum, injection molded plastics, and other production grade housing materials. The housing is sized sufficiently small to fit into a parachutist reserve pack (e.g., a pocket sized 1 inch by 2 inches by 4 inches).

While FIG. 2 illustrates one particular configuration of the EAAD 108, other configurations are possible without departing from the scope of this disclosure. For instance, in some examples, the pressure sensor 206 and the altitude sensor 208 are integrated into a unitary sensor that measures pressure and altitude. Other variations are possible and will be readily understood in light of this disclosure.

Figure 3:
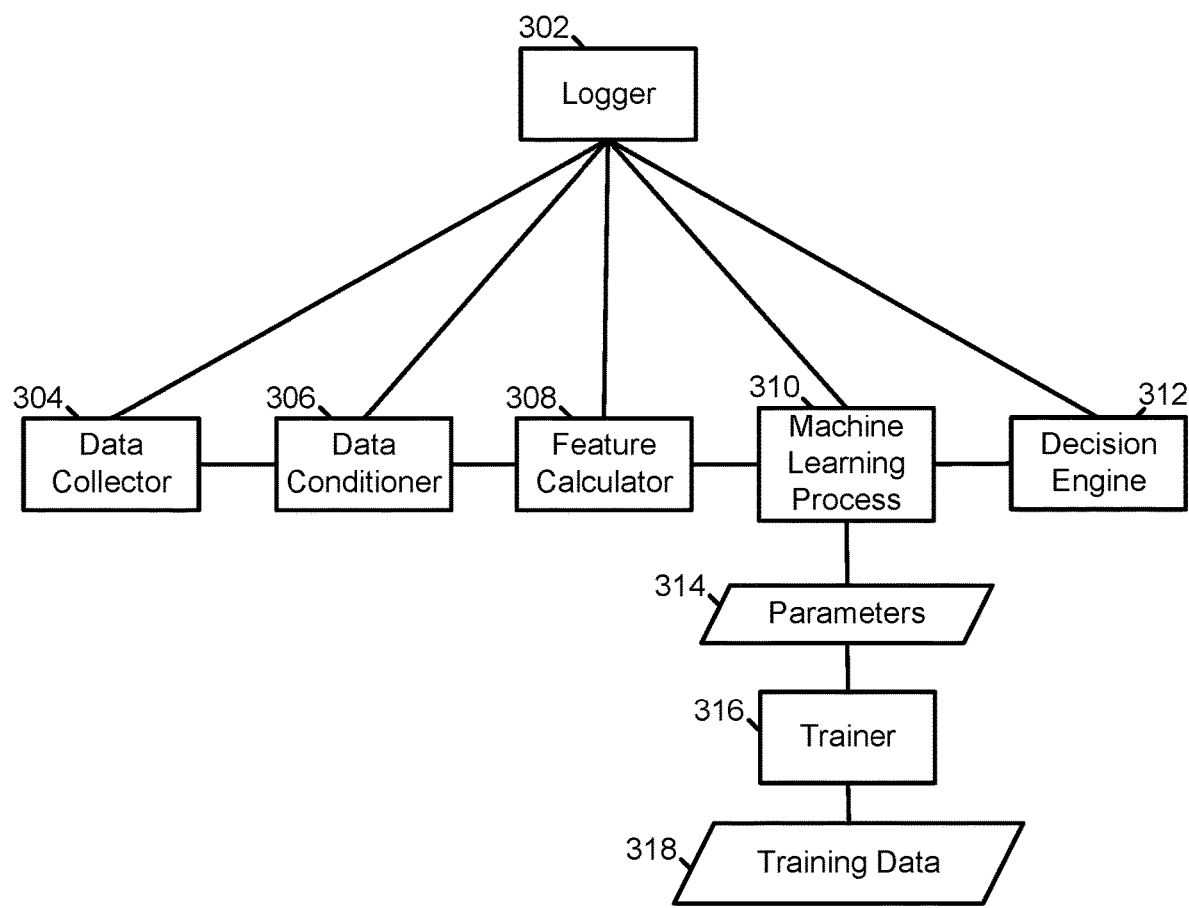
FIG. 3 is a block diagram illustrating logical components implemented by the EAAD illustrated in FIG. 1 in accordance with an example of the present disclosure.

FIG. 3 illustrates the logical architecture of the EAAD 108 in accordance with some examples. As shown in FIG. 3, this logical architecture includes a data collector 304, a data conditioner 306, a feature calculator 308, a machine learning process 310, a decision engine 312, parameters 314, a trainer 316, and training data 318. In some examples, the data collector 304 is configured to receive distinct streams of raw sensor data generated by the various environmental sensors included in the collection of environmental sensors 222. In some examples, the data collector 304 is further configured to provide the sensor data streams to the data conditioner 306. Such provision of each sensor data stream may include providing, to the data conditioner 306, a copy of sensor data, a reference to a copy of sensor data, and/or an indicator that sensor data is available at a predefined memory location.

The data conditioner 306 is configured to segment each sensor data stream received from the data collector 304 into time windows having a predefined, configurable duration (e.g., 1 second) and to smooth each segment. The particular smoothing process performed by the data conditioner 306 varies between examples and may include statistical analysis, filtering, and the like. For instance, in some examples, the data conditioner 306 is configured to filter the sensor data segment using a low-pass, a high-pass, a butterworth, and/or a band-pass filter. In other examples, the data conditioner 306 is configured to calculate a statistical summary (e.g., a straight average, a moving average, a weighted average, etc.) of the sensor values within the sensor data segment and to store the summary as smoothed sensor data. Further, in some examples, the data conditioner 306 executes one or more distinct smoothing processes for each sensor data segment based on the sensor data stream from which the sensor data segment originated. For instance, in at least one example, the data conditioner 306 smooths accelerometer data using a first smoothing process and smooths temperature data using a second smoothing process. In some examples, the data conditioner 306 is configured to provide each smoothed sensor data segment to the feature calculator 308. Such provision of each smoothed sensor data segment may include providing, to the feature calculator 308, a copy of sensor data, a reference to a copy of sensor data, and/or an indicator that sensor data is available at a predefined memory location.

The feature calculator 308 is configured to calculate one or more features from each smoothed sensor data segment received from the data conditioner 306. In some examples, the one or more features are stored in a feature vector having a number of dimensions or elements equal to the number of features calculated. The features calculated may include vertical velocity derived from pressure sensor data, total acceleration derived from accelerometer data, total rotation rate derived from gyroscope data, ambient sound level derived from acoustic data, and ambient light level derived from light data. In one example, vertical velocity is calculated as the change in altitude with time, where altitude is estimated by applying smoothed barometric pressure measurements to the U.S. Standard Atmosphere equation. In one example, total acceleration is calculated as the square root of the sum of the squares of the smoothed acceleration in each direction measured by EAAD sensors. In one example, total rotation rate is calculated as the square root of the sum of the squares of the smoothed rotation rate in each direction measured by EAAD sensors.

In some examples, the feature calculator 308 is configured to provide a feature vector for each smoothed sensor data segment to the machine learning process 310. Such provision of each feature vector may include providing, to the machine learning process 310, a copy of the feature vector, a reference to a copy of the feature vector, and/or an indicator that the feature vector is available at a predefined memory location. In some examples, the feature calculator 308 is configured to provide feature vectors to two or more machine learning process 310 (e.g., one for determining whether the EAAD has exited an aircraft and another for determining whether the main canopy has successfully deployed).

The machine learning process 310 is configured to load its model parameters 314 and to classify each feature vector received from the feature calculator 308 into a first group or a second group. In some examples, this classification may include, for each group, a confidence metric that indicates a likelihood that the feature vector is a member of that group. In certain examples, the machine learning process 310 is an SVM, the first group is a nominal-main group, and the second group is a failed-main group. In these examples, the parameters 314, when loaded by the SVM, enable it to classify feature vectors into either the failed-main group or the nominal-main group. These feature vectors may include vertical velocity, total acceleration, and total rotation rate. In other examples, the machine learning process 310 is an SVM, the first group is an in-aircraft group and the second group is an out-of-aircraft group. In these examples, the parameters 314, when loaded by the SVM, enable it to classify feature vectors into either an in-aircraft group or an out-of-aircraft group. These feature vectors may include vertical velocity, total acceleration, total rotation rate, and ambient light level. In these and other examples, the SVM uses a C-support vector classification with a Gaussian radial basis kernel, where $C=1$ and $\gamma=0.333$.

In still other examples, the machine learning process 310 is an artificial neural network that, when structured and weighted according to the parameters 314, classifies feature vectors into any of the above groups. For instance, the artificial neural network may be a convolutional neural network (CNN) trained (e.g., via back-propagation) with image data that depicts failed and nominal main canopies and/or in-aircraft and out-of-aircraft visual conditions. In these examples, the feature vectors received from the feature calculator 308 include image data acquired by a camera, such as the camera 214. This image data may depict, for example, the main canopy and/or the environment of the EAAD.

In some examples, the CNN is a deep CNN including a sequence of individual layers. These layers may include an input layer, one or more hidden intermediate layers, and an output layer. Each layer of the CNN may include a plurality of neurons. Each of these neurons may be linked to other neurons via one or more weighted links that indicate a flow of data between neurons. In some examples, the weight of each link is determined during execution of a training process, such as a backpropagation process. In general, neurons within a successive layer operate on data generated by neurons in a previous layer, although this is not true in all instances. Each of the neurons may include an activation function executed by the neuron. These activation functions may utilize the weights associated with various links as input.

In some examples, the CNN parses feature vectors to classify image data stored therein. In these examples, the CNN partitions the image data into a predetermined number of portions and provides each of these portions to a neuron of the input layer. In some examples, the next intermediate layer is a convolution layer with neurons that convolve two or more input values received from linked input layer neurons to generate and store a convolved value. In these examples, the next intermediate layer is a pooling layer with neurons that subsample two or more convolved input values received from linked convolution layer neurons. In some examples, the next intermediate layer is a fully connected layer with neurons that process an input value received from a linked pooling layer neuron. In these examples, the output layer is also a fully connected layer with neurons that generate a confidence metric from an input value received from a linked fully connected layer neuron. These confidence metrics indicate a likelihood that the image data belongs to a group associated with the output layer neuron. Thus, the output layer of the CNN is a classification layer that maps image data to a specific group described above (e.g., the group associated with a confidence metric that is highest among the confidence metrics and that is higher than a threshold confidence value).

In some examples, the CNN includes multiple convolution and pooling layers. In other examples, the CNN has an architecture different from the architecture described above. For instance, the CNN may include multiple convolution and pooling layers, or other types of layers. Thus, the examples disclosed herein are not limited to a particular CNN architecture.

In some examples, the machine learning process 310 is configured to provide a classification for each feature vector to the decision engine 312. Such provision of each classification may include providing, to the decision engine 312, a copy of the classification confidence metrics for each group, a reference to a copy of the classification confidence metrics for each group, and/or an indicator that the classification confidence metrics for each group are available at one or more predefined memory locations.

The decision engine 312 is configured to analyze the confidence metric vis-à-vis one or more confidence criteria and, where the confidence criteria are satisfied, execute an action. For instance, in some examples where the machine learning process 310 is configured to classify feature vectors into either the failed-main group or the nominal-main group, the decision engine 312 is configured to determine whether deployment of the reserve canopy is warranted and, if so, transmit a signal to the deployment mechanism 104. In these examples, the decision engine 312 is configured to determine whether the confidence criteria are satisfied by calculating a statistical summary (e.g., an average) of the confidence metric over a predetermined, configurable interval of time and by identifying the confidence criteria as satisfied where the statistical summary transgresses a threshold value (e.g., exceeds a predefined, configurable average value). For instance, in some examples, the decision engine 312 is configured to identify the confidence criteria as satisfied where an average of the confidence metric over 10 seconds exceeds 0.06. Alternatively or additionally, in some examples, the decision engine 312 is configured to identify the confidence criteria as satisfied where an average of the confidence metric over 2.8 seconds exceeds 0.6. Further, in these examples, the decision engine 312 is configured to execute the action by transmitting a signal to the deployment mechanism where the confidence criteria are satisfied.

In some examples where the machine learning process 310 is configured to classify feature vectors into either the in-aircraft group or the out-of-aircraft group, the decision engine 312 is configured to determine whether the EAAD has exited the aircraft and, if so, change the machine learning process 310 to a machine learning process configured to group feature vectors into the failed-main group or the nominal-main group. In these examples, the decision engine 312 is configured to determine whether the confidence criteria are satisfied by calculating a statistical summary (e.g., an average) of the confidence metric over a predetermined, configurable interval of time and by identifying the confidence criteria as having been satisfied where the statistical summary transgresses a threshold value (e.g., exceeds a predefined, configurable average value). Further, in these examples, the decision engine 312 is configured to execute the action by changing the machine learning process to one that classifies feature vectors into either the failed-main group or the nominal-main group.

Alternatively or additionally, in some examples, the decision engine 312 is configured to assess data other than confidence metrics when determining whether the confidence criteria are satisfied. For instance, in some examples, the decision engine 312 monitors values of features and identifies the confidence criteria as satisfied where the feature values transgress a threshold value for a period of time greater than a threshold period. More specifically, in some examples, the decision engine 312 monitors vertical velocity and identifies the confidence criteria as satisfied where the vertical velocity exceeds 26 ft/s toward the ground for a period of time greater than 10 seconds.

In some examples, the decision engine 312 is configured to override confidence metrics generated by the machine learning process when evaluating the confidence criteria. In one example, the decision engine 312 records, as a confidence metric, an override value of 0.01 for any time windows where the maximum acceleration magnitude over 2.6 seconds exceeds 60 ft/s$^2$, as such acceleration magnitude typically only occurs during a nominal deployment of a main. In one example, the decision engine 312 records, as a confidence metric, an override value of 1.0 for any time windows where the vertical velocity exceeds 70 ft/s in the direction of the ground, as such vertical velocity typically only occurs with a no-main or streamer failure. In one example, to reduce the likelihood of in-aircraft deployment, the decision engine 312 records, as a confidence metric, an override value of 0.01 where the magnitude of at least one of the features is within a threshold range of its baseline value. This state rarely occurs during a jump; therefore, this state is an attractive discriminator for in/out of aircraft detection. For vertical velocity, acceleration magnitude, and rotation rate, threshold ranges are 6 ft/s, 2.5 ft/s$^2$, and 10 deg/s, and baseline values are 0 ft/s, 32.2 ft/s$^2$, and 0 deg/s, respectively. In one example, to reduce the likelihood of false positives, if the confidence metric is greater than 0.06, and the vertical velocity is greater than 26 ft/s in the direction of the ground and less than 8 ft/s in the direction of the ground, the decision engine 312 records, as a confidence metric, an override value of 0.01. Thus, some examples of the decision engine 312 use a combination of machine learning and procedural logic to determine whether to execute an action.

The logger 302 is configured to receive and store data generated by each of the data collector 304, the data conditioner 306, the feature calculator 308, the machine learning process 310, and the decision engine 312. Each of these components is configured to provide data to the logger 302. Such data provision may include providing, to the logger 302, a copy of the data, a reference to a copy of the data, and/or an indicator that the data is available at one or more predefined memory locations. In some examples, the logger 302 is configured to store data received for logging within the memory 202 (e.g., within an SD card or other non-volatile data storage).

The trainer 316 is configured to train the machine learning process 310 to generate the parameters 314 using the training data 318. The training data is labeled with weight and main parachute deployment configuration (e.g. nominal, no main, streamer, partial). For instance, where the machine learning process 310 is an SVM, the trainer 316 is configured to execute a sub-gradient descent process or a coordinate descent process using the training data 318 to train the SVM. Where the machine learning process 310 is a neural network, the trainer 316 is configured to execute a back-propagation process using the environmental data to train the neural network. In some examples, the training data 318 includes a set of labeled feature vectors generated during execution of a training process, such as the training process 400 described below with reference to FIG. 4.

In some examples, the trainer 316 is implemented by a computing device (e.g., the computing device 900 described below with reference to FIG. 9) that is distinct from the EAAD 108. In these examples, the trainer 316 is supplied with training data 318 logged by the EAAD 108 during execution of the training process 400.

While in the examples described above apportion features and functions to specific physical and logical components, it is appreciated that other examples may apportion these features and functions to physical and logical components differently. For instance, in some examples, some or all of the components of the logical architecture described above may be implemented as special-purpose hardware, such as an application specific integrated circuit or field programmable gate array, without departing from the scope of this disclosure. Moreover, some of the components of the physical architecture described above may be implemented as specially programmed software. Thus combinations of hardware and software other than those described above may be used to provide the features and functions described herein without departing from the scope of this disclosure.

EAAD System Processes

Figure 4:
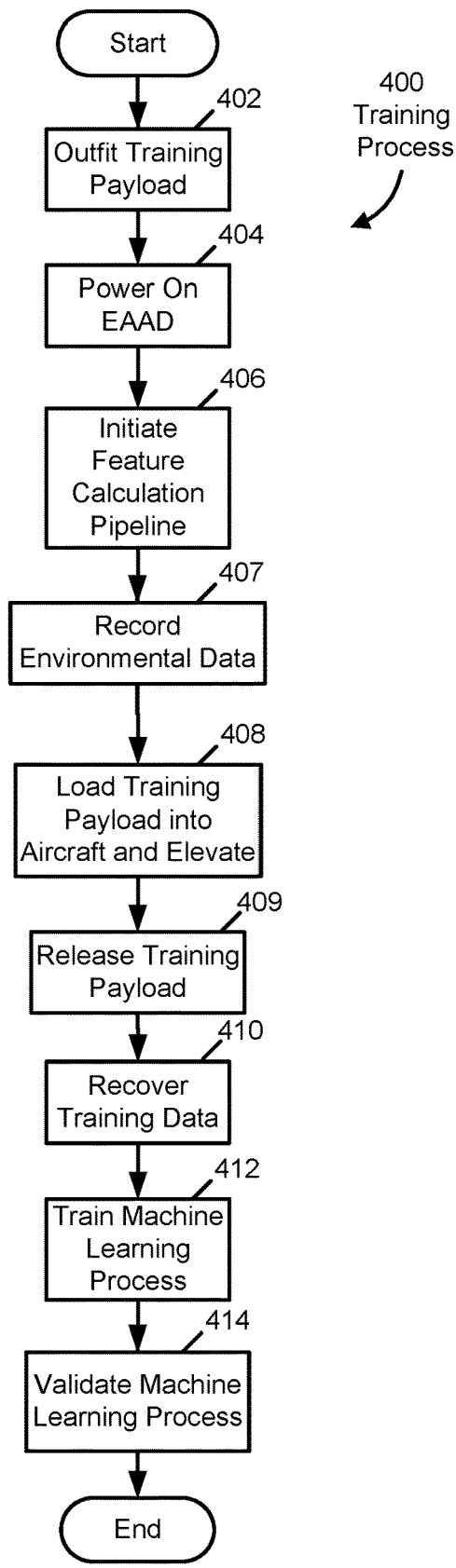
FIG. 4 is a flow diagram illustrating a training process in accordance with an example of the present disclosure.

In various examples disclosed herein an EAAD (e.g., the EAAD 108) and/or another computing device (e.g., the computing device 900) executes training processes that generate sets of training data (e.g., the training data 318) and that use the training data to train a machine learning process (e.g., the machine learning process 310). FIG. 4 illustrates one example of these training processes, the training process 400.

As shown in FIG. 4, the training process 400 starts in act 402 with outfitting a training payload with a parachute rig including an EAAD (e.g., the parachute rig 100). In act 404, the EAAD included in the parachute rig is powered on. Due to the characteristics of the EAAD, no further interaction between the operator and the EAAD (e.g., calibration of air pressure at ground level, pressure altitude at ground level, or the like) is required. In act 406, the EAAD initiates a feature calculation pipeline. One example of a feature calculation pipeline initiated by the EAAD in the act 406 is illustrated in FIG. 5.

Figure 5:
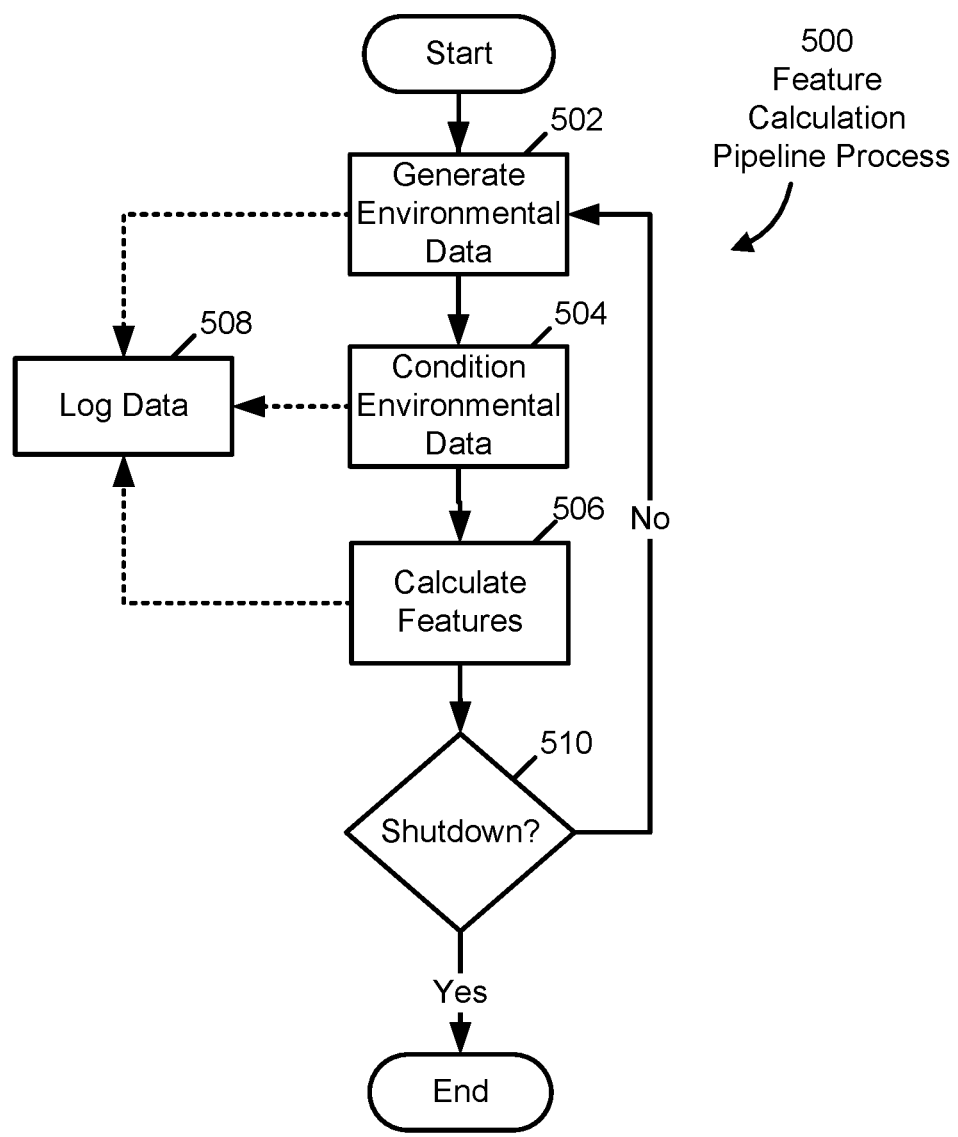
FIG. 5 is a flow diagram illustrating a feature calculation pipeline process in accordance with an example of the present disclosure.

As shown in FIG. 5, the feature calculation pipeline process 500 starts in act 502 with the EAAD generating environmental data. In some examples, the EAAD generates this environmental data by executing a data collector (e.g., the data collector 304). In act 504, the EAAD conditions the environmental data. In some examples, the EAAD conditions the environmental data by executing a data conditioner (e.g., the data conditioner 306). In act 506, the EAAD calculates features from the environmental data. In some examples, the EAAD calculates features from the environmental data by executing a feature calculator (e.g., the feature calculator 308). In act 508, the EAAD logs the various forms of the environmental data output by each of the acts 502, 504, and 506. In some examples, the EAAD logs the environmental data by executing a logger (e.g., the logger 302).

In act 510, the EAAD determines whether a shutdown of the EAAD has been initiated via a user interface (e.g., the user interface 110). If so, the EAAD discontinues execution of the feature calculation pipeline process 500. Otherwise, the EAAD returns to the act 502 to execute the next iteration of the pipeline.

Processes in accord with the feature calculation pipeline process 500 enable the EAAD to monitor and record parameters of its operating environment for training data generation and/or mission reconstruction purposes.

Returning to the training process 400 illustrated FIG. 4, in act 407 the EAAD begins recording environmental data. In act 408 the outfitted training payload is loaded into the aircraft, flown to a target altitude, and released from an aircraft. After loading and during take-off and flight, the EAAD records environmental data indicative of an in-aircraft environment. In act 409, the outfitted training payload is released from the aircraft and descends to ground level. During release and descent, the EAAD records environmental data indicative of an out-of-aircraft environment. The characteristics of the descent vary based on the configuration of the payload and parachute rig selected. As such, during descent, the EAAD records environmental data indicative of either a nominal main canopy or a failed main canopy. In act 410, after the training payload has arrived at ground level, environmental data logged by the EAAD is recovered (e.g., by accessing the environmental data stored within the memory 202 by the logger) and training data (e.g., the training data 318) is calculated. In some examples, the training data 318 includes a set of feature vectors generated by the feature calculation pipeline. Also, in some examples, the act 410 includes labeling, by a human via the user interface of the EAAD or a user interface of the other computing device, one or more portions of the training data with one or more group identifiers. For instance, a portion of the training data logged while the training payload was in the aircraft may be labeled with an in-aircraft identifier. A portion of the training data logged contemporaneously with the training payload's release from the aircraft (and for a brief transition period, such as 2-3 seconds, thereafter) may be labeled with an out-of-aircraft identifier. A portion of the training data logged from the end of the transition period until successful deployment of the main canopy is evident may be labeled with a nominal-main identifier. A portion of the training data logged from the end of the transition period until failure of the main canopy is evident may be labeled with a failed-main identifier.

In act 412, a computing device (e.g., the EAAD or another computing device) trains a machine learning process (e.g., the machine learning process 310) using a portion of the training data. In act 414, the trained machine learning process is validated using another portion of the training data, and the training process 400 ends. In some examples, the EAAD or other computing device trains the machine learning process by executing a trainer (e.g., the trainer 316).

Processes in accord with the training process 400 enable creation of a training data set that can be used to train machine learning processes to accurately classify environmental data into groups that can be acted upon to control operation of the EAAD and its constituent parachute rig.

Figure 6:
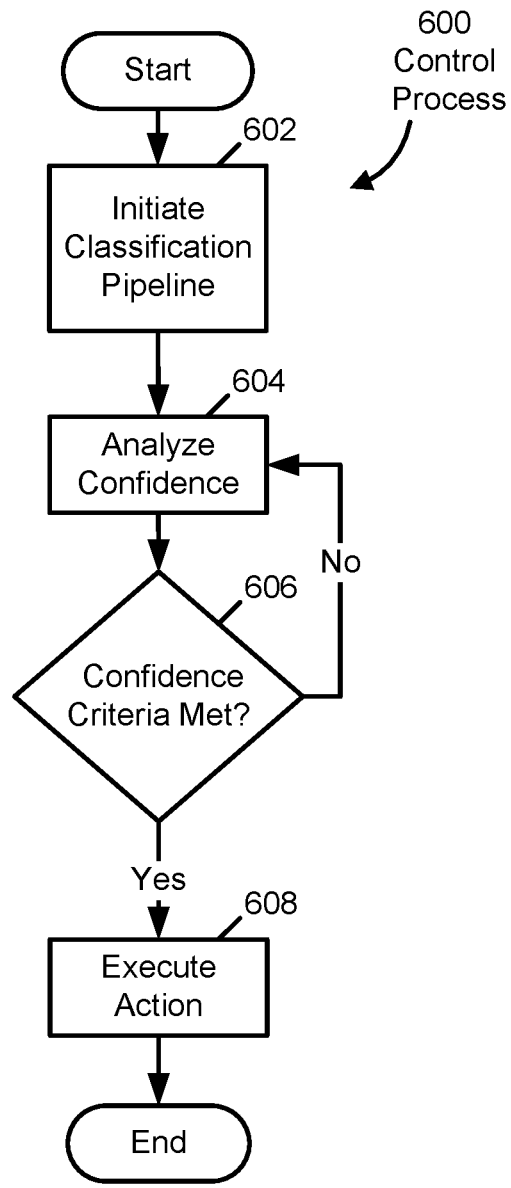
FIG. 6 is a flow diagram illustrating a control process in accordance with an example of the present disclosure.

In various examples disclosed herein the EAAD executes processes that control operation of its components using a trained machine learning process (e.g., the machine learning process 310). FIG. 6 illustrates one example of these control processes, the EAAD control process 600.

As shown in FIG. 6, the control process 600 starts in act 602 with the EAAD initiating a classification pipeline. One example of a classification pipeline initiated by the EAAD in the act 602 is illustrated in FIG. 7.

Figure 7:
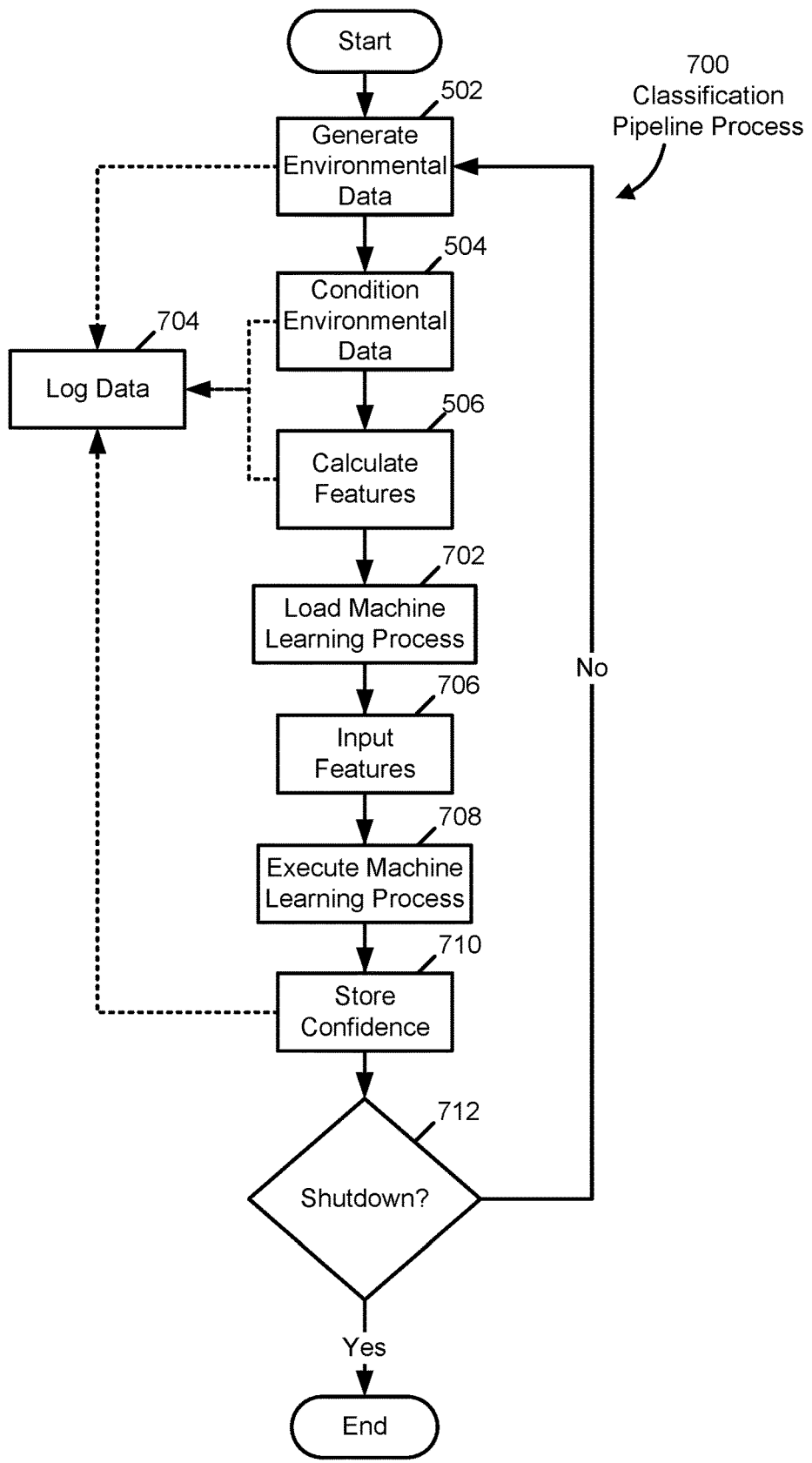
FIG. 7 is a flow diagram illustrating a classification pipeline process in accordance with an example of the present disclosure.

As shown in FIG. 7, the classification pipeline process 700 includes the acts of the feature calculation pipeline process 500 described above with reference to FIG. 5. The classification pipeline process 700 starts with the EAAD executing the act 502 and proceeds with the EAAD executing the acts 504 and 506 as described above. However, in act 702, the EAAD loads the machine learning process. In act 706, the EAAD provides the features calculated in the act 506 to the machine learning process. In act 708, the machine learning process operates on the input features and generates one or more confidence metrics. In act 710, the machine learning process stores the one or more confidence metrics in memory (e.g., the memory 202). Via the combination of acts 702, 706, 708, and 710, the machine learning process classifies the features calculated in the act 506. In act 704, the EAAD logs the various forms of the environmental data output by each of the acts 502, 504, 506, and 710. In some examples, the EAAD logs the environmental data by executing the logger.

In act 712, the EAAD determines whether a shutdown of the EAAD has been initiated via the user interface. If so, the EAAD discontinues execution of the classification pipeline process 700. Otherwise, the EAAD returns to the act 502 to execute the next iteration of the pipeline.

Processes in accord with the classification pipeline process 700 enable the EAAD to monitor and classify parameters of its operating environment for mission control purposes.

Returning to the control process 600 illustrated in FIG. 6, in act 604 the EAAD analyzes classification confidence metrics generated in the act 702. In act 606, the EAAD determines whether confidence criteria associated with the classification confidence metrics are met. In some examples, the EAAD analyzes the classification confidence metrics and determines whether the confidence criteria associated with the classification confidence metrics are met by executing a decision engine (e.g., the decision engine 312).

Where the confidence criteria associated with the classification confidence metrics are met, the EAAD proceeds to act 608. Where the confidence criteria associated with the classification confidence metrics has not been met, the EAAD returns to the act 604 where it continues to analyze classification confidence metrics generated by the classification pipeline.

In the act 608, the EAAD executes an action. In some examples, this action may be changing from one classifier of environmental data to another (e.g. where the confidence criteria being met indicates a transition of the EAAD from an in-aircraft environment to an out-of-aircraft environment). In other examples, this action may be activation of a deployment mechanism (e.g., the deployment mechanism 104) for a reserve canopy of the parachute rig.

Processes in accord with the control process 600 enable the EAAD to control its operation during execution of a mission.

Figure 8:
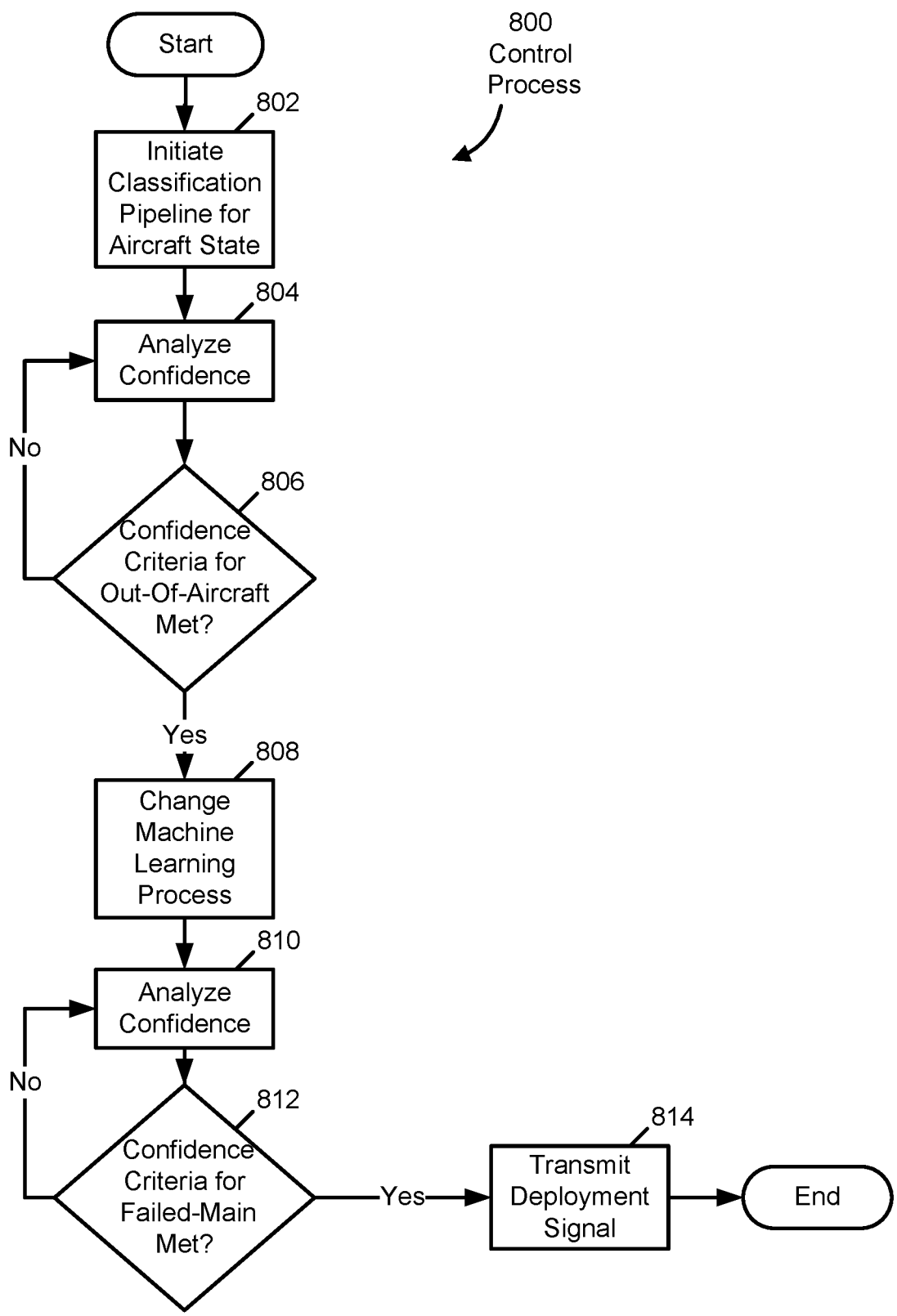
FIG. 8 is a flow diagram illustrating another control process in accordance with an example of the present disclosure.

FIG. 8 illustrates another example of the control processes executed by the EAAD to control its operation. As shown in FIG. 8, the control process 800 starts in act 802 with the EAAD initiating a classification pipeline in which the machine learning process classifies environmental data into either an in-aircraft group or an out-of-aircraft group. In act 804, the EAAD analyzes classification confidence metrics generated by the machine learning process. In act 806, the EAAD determines whether confidence criteria required to identify the EAAD as being in an out-of-aircraft environment are met. In some examples, the EAAD analyzes the classification confidence metrics and determines whether the confidence criteria are met by executing the decision engine.

If the confidence criteria required to identify the EAAD as being in an out-of-aircraft environment have not been met, the EAAD returns to the act 804 to continue to analyze classification confidence metrics generated by the classification pipeline. Otherwise, the EAAD proceeds to act 808.

In the act 808, the EAAD changes the machine learning process being used in the classification pipeline to a machine learning process that classifies environmental data into either a failed-main group or a nominal-main group. In act 810, the EAAD analyzes classification confidence metrics generated by the machine learning process. In act 812, the EAAD determines whether confidence criteria required to identify a failed deployment of the main canopy are met. In some examples, the EAAD analyzes the classification confidence metrics and determines whether the confidence criteria are met by executing the decision engine.

If the confidence criteria required to identify a failed deployment of the main canopy have not been met, the EAAD returns to the act 810 to continue to analyze classification confidence metrics generated by the classification pipeline. Otherwise, in act 814 the EAAD transmits a signal to the deployment mechanism to initiate deployment of a reserve canopy of the parachute rig.

Processes in accord with the control process 800 enable the EAAD to control its operation during execution of a mission. While the control process 800 changes the machine learning process used to classify the data in act 808, other examples concurrently classify data using two or more machine learning processes.

The processes disclosed herein each depict one particular sequence of acts in a particular example. The acts included in these processes may be performed by, or using, one or more EAADs specially configured as discussed herein. Some acts are optional and, as such, may be omitted in accord with one or more examples. Additionally, the order of acts can be altered, or other acts can be added, without departing from the scope of the apparatus and methods discussed herein. Furthermore, as discussed above, in at least one example, the acts are performed on a particular, specially configured machine, namely an EAAD configured according to the examples disclosed herein.

Computing Device

Figure 9:
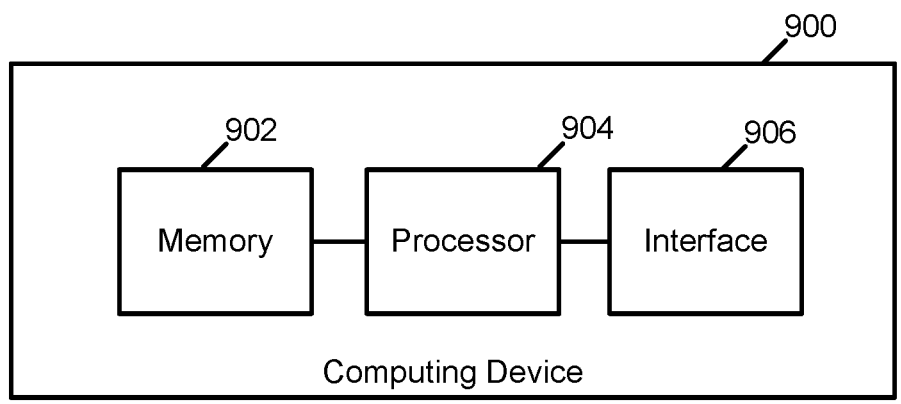
FIG. 9 is a block diagram illustrating a computing device that may implement some logical components of the EAAD in accordance with an example of the present disclosure.

FIG. 9 illustrates another computing device that can be used to implement various components described herein. As shown, the computing device 900 includes memory 902, at least one processor 904, and at least one interface 906. Although the particular types and models of these components may vary between computing devices, it is appreciated that each computing device includes a processor, memory, and an interface.

The interface 906 includes one or more physical interface devices such as input devices, output devices, and combination input/output devices and a software stack configured to drive operation of the devices. Interface devices may receive input or provide output. More particularly, output devices may render information for external presentation and input devices may accept or generate information from external sources. Examples of interface devices include keyboards, mouse devices, trackballs, microphones, touch screens, printing devices, display screens, speakers, network interface cards, environmental sensors, and the like. Interface devices allow programmable devices to exchange information and communicate with external entities, such as users and other systems.

The memory 902 includes volatile and/or non-volatile (i.e., non-transitory or non-transient) data storage that is readable and/or writeable by the processor 904. The memory 902 stores programs and data used or manipulated during operation of the computing device 900. The programs stored in the memory 902 are a series of instructions that are executable by the at least one processor 904. The memory 902 may include relatively high-performance data storage, such as registers, caches, dynamic random access memory, and static memory. The memory 902 may further include a relatively low performance, non-volatile, computer readable and/or writable data storage medium such as flash memory or an optical or magnetic disk. Various examples may organize the memory 902 into particularized and, in some cases, unique structures to store data in support of the components disclosed herein. These data structures may be specifically configured to conserve storage space or increase data exchange performance and may be sized and organized to store values for particular data and types of data.

To implement and/or control specialized components in some examples, the processor 904 executes a series of instructions (i.e., one or more programs) that result in manipulated data. The processor 904 may be any type of processor, multiprocessor, microprocessor, or controller known in the art. The processor 904 is connected to and communicates data with the memory 902 and the interfaces 906 via an interconnection mechanism, such as a bus or some other data connection. This interconnection mechanism is represented in FIG. 9 by lines connecting the components within the computing device. In operation, the processor 904 causes data and/or encoded instructions to be read from a non-volatile data storage medium in the memory 902 and written to high performance data storage. The processor 904 manipulates the data and/or executes the encoded instructions within the high-performance data storage and copies the manipulated data to the data storage medium after processing is completed.

Although the computing device 900 is shown as an example of a computing device capable of executing the processes disclosed herein, examples are not limited to the computing device shown in FIG. 9. For example, various processes may be executed by one or more computing devices having a different architectures or components than those shown in FIG. 9. For instance, a programmable device may include specially programmed, special-purpose hardware, such as an application-specific integrated circuit (ASIC), a field-programmable gate array (FPGA), a complex programmable logic device (CPLD), and other implementations in silicon or other hardware tailored to execute processes disclosed herein. Thus, components of a computing device as disclosed herein may be implemented in software, hardware, firmware, or any combination thereof.

For example, as described above, the processor 904 may be a general-purpose processor. However, when executing a specific software process as described herein (e.g., as depicted in any of FIGS. 3-8), the processor 904 becomes a special purpose processor capable of making specific logic-based determinations based on input data received, and further capable of providing one or more outputs that can be used to control or otherwise inform subsequent processing to be carried out by the processor 904 and/or other processors or circuitry with which processor 904 is communicatively coupled. The processor 904 reacts to specific input stimulus in a specific way and generates a corresponding output based on that input stimulus. In this sense, the structure of processor 904 according to one example is defined by the processes shown in any of FIGS. 3-8. Moreover, in some example cases, the processor 904 proceeds through a sequence of logical transitions in which various internal register states and/or other bit cell states internal or external to the processor 904 may be set to logic high or logic low. This specific sequence of logic transitions is determined by the state of electrical input signals to the processor 904 and a special-purpose structure is effectively assumed by the processor 904 when executing each software instruction of the processes shown in FIGS. 3-8. Specifically, those instructions anticipate the various stimulus to be received and change the implicated memory states accordingly. In this way, the processor 904 may generate and store or otherwise provide useful output signals. Thus, it is appreciated that the processor 904, during execution of a software process becomes a special purpose machine, capable of processing only specific input signals and rendering specific output signals based on the one or more logic operations performed during execution of each instruction. In at least some examples, the processor 904 is configured to execute a function where software is stored in a data storage device coupled with the processor 904 (e.g., the memory 902) and that software is configured to cause the processor 904 to proceed through a sequence of various logic operations that result in the function being executed.

Having thus described several aspects of at least one example, it is to be appreciated that various alterations, modifications, and improvements will readily occur to those skilled in the art. For instance, examples disclosed herein may also be used in other contexts. In one such example, the EAAD may be used to protect operators other than paratroopers. Alternatively or additionally, the EAAD can be used as a data/instrumentation logger (e.g., a bundle tracker) and can track vehicles or other payloads. Such alterations, modifications, and improvements are intended to be part of this disclosure, and are intended to be within the scope of the examples discussed herein. Accordingly, the foregoing description and drawings are by way of example only.

The invention claimed is:

1. An enhanced automatic activation device (EAAD) comprising:
   a housing;
   a plurality of environmental sensors disposed within the housing, wherein the plurality of environmental sensors is configured to originate a plurality of environmental data streams;
   a connection to a deployment mechanism of a secondary decelerator, the connection being disposed at least partially within the housing; and
   at least one processor coupled to the plurality of environmental sensors and the connection, the at least one processor being configured to:
      segment each environmental data stream of the plurality of environmental data streams into a plurality of time windows, each time window of the plurality of time windows comprising a set of environmental data;
      execute at least one machine learning process configured to classify environmental data of the plurality of segmented environmental data streams into either a first group associated with nominal deployment of a primary decelerator or a second group associated with at least partially failed deployment of the primary decelerator; and
      transmit a signal to the deployment mechanism of the secondary decelerator where at least one criterion is met, the at least one criterion including that that the environmental data is classified within the second group.

2. The EAAD of claim 1, wherein the primary decelerator comprises a main canopy of a parachute rig and the secondary decelerator comprises a reserve canopy of the parachute rig.

3. The EAAD of claim 1, wherein the plurality of environmental sensors comprises two or more of a barometer, an altimeter, a hygrometer, a thermometer, a magnetometer, a microphone, a photodetector, a global positioning system (GPS) receiver, a camera, an accelerometer, and a gyroscope.

4. The EAAD of claim 2, wherein the deployment mechanism of the secondary decelerator comprises either a cutter or a release.

5. The EAAD of claim 1, wherein the at least one machine learning process comprises one or more of a support vector machine or an artificial neural network.

6. The EAAD of claim 1, wherein the plurality of environmental sensors is configured to acquire a plurality of signals to generate the plurality of environmental data streams and the at least one processor is configured to determine whether the at least one criterion is met in less than 5 seconds from acquisition of the signals.

7. The EAAD of claim 1, wherein the at least one machine learning process is configured to classify the environmental data of the plurality of segmented environmental data streams independently of air pressure at ground level and pressure altitude at ground level.

8. The EAAD of claim 1, wherein the at least one processor is further configured to smooth each set of environmental data to generate a plurality of smoothed sets of environmental data.

9. The EAAD of claim 8, wherein the at least one processor is configured to smooth at least one set of environmental data at least in part by averaging two or more elements of the at least one set.

10. The EAAD of claim 8, wherein the at least one processor is configured to smooth at least one set of environmental data at least in part by filtering the at least one set using one or more of a high-pass filter, a low-pass filter, a band-pass filter, or a butterworth filter.

11. The EAAD of claim 8, wherein the at least one processor is further configured to calculate a feature from each set of environmental data to generate a plurality of feature vectors.

12. The EAAD of claim 11, wherein each feature vector of the plurality of feature vectors comprises elements descriptive of vertical velocity, total acceleration, and total rotation.

13. The EAAD of claim 12, wherein the at least one machine learning process is configured to classify the environmental data at least in part by classifying the plurality of feature vectors.

14. The EAAD of claim 1, wherein the at least one machine learning process is configured to generate one or more metrics indicative of a confidence that the environmental data is a member of the second group, and
   wherein the at least one criterion includes that a summary value based on the one or more metrics has a value that exceeds a threshold value.

15. The EAAD of claim 14, wherein the summary value is an average of the one or more metrics.

16. The EAAD of claim 1, wherein the at least one machine learning process is further configured to classify the environmental data of the plurality of segmented environmental data streams into either a third group associated with an in-aircraft environment or a fourth group associated with an out-of-aircraft environment.

17. The EAAD of claim 16, wherein the at least one machine learning process is configured to generate one or more metrics indicative of a confidence that the environmental data of the plurality of segmented environmental data streams is a member of the fourth group, and
   wherein the at least one criterion includes that a summary value based on the one or more metrics has a value that exceeds a threshold value.

18. A method of deploying a decelerator using an enhanced automatic activation device (EAAD), the method comprising:
   obtaining, by the EEAD, a plurality of environmental data streams from a plurality of environmental sensors;
   segmenting, by the EEAD, each environmental data stream of the plurality of environmental data streams into a plurality of time windows, each time window of the plurality of time windows comprising a set of environmental data;
   executing, by the EAAD, at least one machine learning process;
   classifying, by the at least one machine learning process, environmental data of the plurality of segmented environmental data streams into either a first group associated with nominal deployment of a primary decelerator or a second group associated with at least partially failed deployment of the primary decelerator; and
   transmitting, by the EAAD, a signal to a deployment mechanism of a secondary decelerator where at least one criterion is met, the at least one criterion including that the environmental data is classified within the second group.

19. The method of claim 18, further comprising:
acquiring, by the plurality of environmental sensors, a plurality of signals to generate the plurality of environmental data streams; and
determining whether the at least one criterion is met in less than 5 seconds from acquisition of the signals.

20. The method of claim 18, further comprising classifying the environmental data of the plurality of segmented environmental data streams independently of air pressure at ground level and pressure altitude at ground level.

21. The method of claim 18, further comprising smoothing each set of environmental data to generate a plurality of smoothed sets of environmental data.

22. The method of claim 21, further comprising smoothing at least one set of environmental data at least in part by averaging two or more elements of the at least one set.

23. The method of claim 21, further comprising smoothing at least one set of environmental data at least in part by filtering the at least one set using one or more of a high-pass filter, a low-pass filter, a band-pass filter, or a butterworth filter.

24. The method of claim 21, further comprising calculating a feature from each set of environmental data to generate a plurality of feature vectors.

25. The method of claim 24, wherein classifying the environmental data comprises classifying the plurality of feature vectors.

26. The method of claim 24, further comprising generating, by the at least one machine learning process, one or more metrics indicative of a confidence that the environmental data is a member of the second group, and wherein the at least one criterion includes that a summary value based on the one or more metrics has a value that exceeds a threshold value.

27. The method of claim 18, further comprising classifying, by the at least one machine learning process, the environmental data of the plurality of segmented environmental data streams into either a third group associated with an in-aircraft environment or a fourth group associated with an out-of-aircraft environment.

28. The method of claim 27, further comprising:
generating, by the at least one machine learning process, one or more metrics indicative of confidence that the environmental data is a member of the fourth group; and
wherein the at least one criterion includes that a summary value based on the one or more metrics has a value that exceeds a threshold value.

29. A non-transitory computer readable medium storing sequences of instruction for deploying a decelerator, the sequences of instructions comprising instructions configured to instruct at least one processor to:
obtain a plurality of environmental data streams from a plurality of environmental sensors;
segment each environmental data stream of the plurality of environmental data streams into a plurality of time windows, each time window of the plurality of time windows comprising a set of environmental data;
execute at least one machine learning process configured to classify environmental data of the plurality of segmented environmental data streams into either a first group associated with nominal deployment of a primary decelerator or a second group associated with at least partially failed deployment of the primary decelerator; and
transmit a signal to a deployment mechanism of a secondary decelerator where at least one criterion is met, the at least one criterion including that the environmental data is classified within the second group.

30. The computer readable medium of claim 29, wherein the instructions to execute the at least one machine learning process comprise instructions to execute one or more of a support vector machine or an artificial neural network.

31. The computer readable medium of claim 29, wherein the sequences of instructions comprise instructions to determine whether the at least one criterion is met in less than 5 seconds from acquisition of signals acquired to generate the plurality of environmental data streams.

32. The computer readable medium of claim 29, wherein the instructions to execute the at least one machine learning process comprise instructions to classify the environmental data of the plurality of segmented environmental data streams independently of air pressure at ground level and pressure altitude at ground level.

33. The computer readable medium of claim 29, wherein the instructions to execute the at least one machine learning process comprise instructions to classify the environmental data of the plurality of segmented environmental data streams at least in part by classifying a plurality of feature vectors, each feature vector of the plurality of feature vectors comprising elements descriptive of vertical velocity, total acceleration, and total rotation.

* * * * *